United States Patent [19]

Pranger et al.

[11] Patent Number: 5,743,585
[45] Date of Patent: Apr. 28, 1998

[54] TRUCK CAB CONSOLE WITH INTEGRAL TRASH CONTAINER

[75] Inventors: Michael G. Pranger, Hillsboro; Mark S. Hurayt, Aloha, both of Oreg.

[73] Assignee: Freightliner Corporation, Portland, Oreg.

[21] Appl. No.: 662,248

[22] Filed: Jun. 14, 1996

[51] Int. Cl.$^6$ ........................................ B60R 7/06
[52] U.S. Cl. ............................ 296/37.12; 224/275
[58] Field of Search ........................ 296/37.12, 37.11, 296/37.9; 224/275, 539, 42.11, 483; D3/304, 201

[56] References Cited

U.S. PATENT DOCUMENTS

| | | | |
|---|---|---|---|
| D. 24,488 | 7/1895 | Garlic | D3/304 |
| D. 280,944 | 10/1985 | Herbert | D34/40 |
| D. 370,701 | 6/1996 | Thomsen | D21/108 |
| 3,088,771 | 5/1963 | Weigle | 296/37 |
| 3,337,282 | 8/1967 | Groff et al. | 312/245 |
| 3,500,493 | 3/1970 | Coleman | 15/313 |
| 4,537,376 | 8/1985 | Buku | 248/97 |
| 5,230,551 | 7/1993 | Kramer | 312/204 |
| 5,246,190 | 9/1993 | Swirkal | 248/100 |
| 5,259,655 | 11/1993 | Anderson | 296/70 |
| 5,297,709 | 3/1994 | Dykstra et al. | 224/281 |
| 5,393,137 | 2/1995 | Bivens et al. | 312/332 |
| 5,538,338 | 7/1996 | Biggers | 312/319.9 |

*Primary Examiner*—David M. Mitchell
*Attorney, Agent, or Firm*—Klarquist Sparkman Campbell Leigh & Whinston

[57] ABSTRACT

A trash container apparatus is provided integral with a truck cab console. A pivotable trash door is positioned on the cab console to allow access to the inside of the trash container for disposing trash therein. The inner sides of the trash container have protrusions to retain the top edge of a trash bag so that the bag lines the container and is capable of receiving trash. The trash container is movable from a closed position to an open position. In the open position, the container is positioned in the area substantially in front of the passenger seat to allow access to the inside of the container for removing any accumulated trash. Slide rails attached to the container are capable of sliding along guide tracks attached to the cab console for moving the container from a closed to an open position, or vice versa. The trash container has a handle for grasping when being moved.

19 Claims, 3 Drawing Sheets

TRUCK CAB CONSOLE WITH INTEGRAL TRASH CONTAINER

FIELD OF THE INVENTION

This invention relates to a trash container mechanism for a vehicle, and in particular, a truck cab having a console with an integral trash container.

BACKGROUND OF THE INVENTION

The design of truck cab consoles has increasingly taken into account ergonomic considerations, or the interaction of the driver and occupants with the instruments and features in the cab. However, despite the need, one area seemingly overlooked in this regard is the design and incorporation of a suitable trash container for the cab.

During long trips, a truck driver can accumulate a substantial amount of trash in the truck cab, or trash may accumulate over a period of time if it is not routinely disposed outside of the cab. Further, since many truck cabs are equipped with sleeping quarters, a truck driver may actually live in the cab during trips. As a result, the driver can easily accumulate a substantial amount of waste or trash during the trip. Often, there may not be a convenient place to properly dispose of the trash outside the cab. Thus, the truck driver must provide some means for storing the trash until it can be disposed. However, such means for doing so are often cumbersome or undesirable for several reasons.

For instance, trash or garbage bags can be hung on knobs or the like in a cab or placed on the floor and used for storing trash inside of the cab. Also, trash containers or boxes are sometimes used by placing them on the floor of the cab or on the seats. However, these containers are somewhat obtrusive and occupy precious space inside the cab. In this respect, such trash containers can obstruct access to certain areas of the cab, and may even interfere with the occupants operation or interaction with the cab's instruments or features. Even further, such trash containers are unsightly and detract from the overall appearance of the cab. However, if the trash container is partially hidden or placed out of the driver's way, such as on the floor under the passenger or driver seat, it may nonetheless be difficult for the driver to reach the container while operating the truck.

Accordingly, there is a need for a truck having a cab with a trash container which is designed to overcome the problems discussed above and other problems.

SUMMARY OF THE INVENTION

The present invention comprises a trash container which is incorporated or integrated into the overall design of the cab console. The trash container is readily accessible to the cab's occupants, including both the passenger and driver, but yet is not obtrusive and does not interfere with the occupant's operation of the cab's instruments or features. Furthermore, the trash container is aesthetically pleasing and does not detract from the cab's overall appearance. Moreover, the trash container is easy to remove and clean when necessary.

In accordance with one embodiment of the present invention, a trash container has at least one front side wall which is integral with a front side or wall of a cab console when the trash container is in a closed position. Also, in the closed position, the inside of the trash container is not visible to the cab's occupants. The trash container is movable to an open position in which the trash container is positioned in an area substantially in front of the passenger seat to allow easy access to the inside of the container to remove any accumulated trash.

In another aspect of the present invention, the trash container has two front side walls, one of said front side walls substantially facing the cab's driver seat, and the other front side wall substantially facing the cab's passenger seat. The front side walls of the trash container form a portion of the front walls of the cab console. The inside of the trash container is not visible to the cab's occupants when the trash container is in the closed position.

As yet another aspect of the present invention, a trash door is provided to allow access to the inside of the trash container when the trash container is in the closed positioned. Preferably, the trash door is positioned in a wall of the cab console above the trash container. In one form, the door is pivotable about a horizontal pivot axis of a hinge to move it from a closed position to an open position to allow access to the inside of the trash container for disposing trash therein. In the illustrated embodiment, the trash door is located in a wall of the cab console which faces the driver. This allows the driver easy access to the container for disposing of trash while driving.

In a further aspect, a plurality of protrusions are located on the inner sides of the trash container. The protrusions are capable of retaining the top edge of a trash bag along a substantial portion on the inner perimeter of the container. In this manner, the trash bag lines the container and receives trash deposited therein. The trash container can be easily and conveniently cleaned by simply moving the container to the open position and removing the trash bag.

In yet a further aspect of the present invention, a handle is provided on the front side of the trash container to allow an occupant of the cab to move the trash container from the closed position to an open position, or vice versa.

These and other objects, features and advantages of the present invention will become more apparent with reference to the drawings and the description below.

DETAILED DESCRIPTION OF A PREFERRED EMBODIMENT

Figure 1:
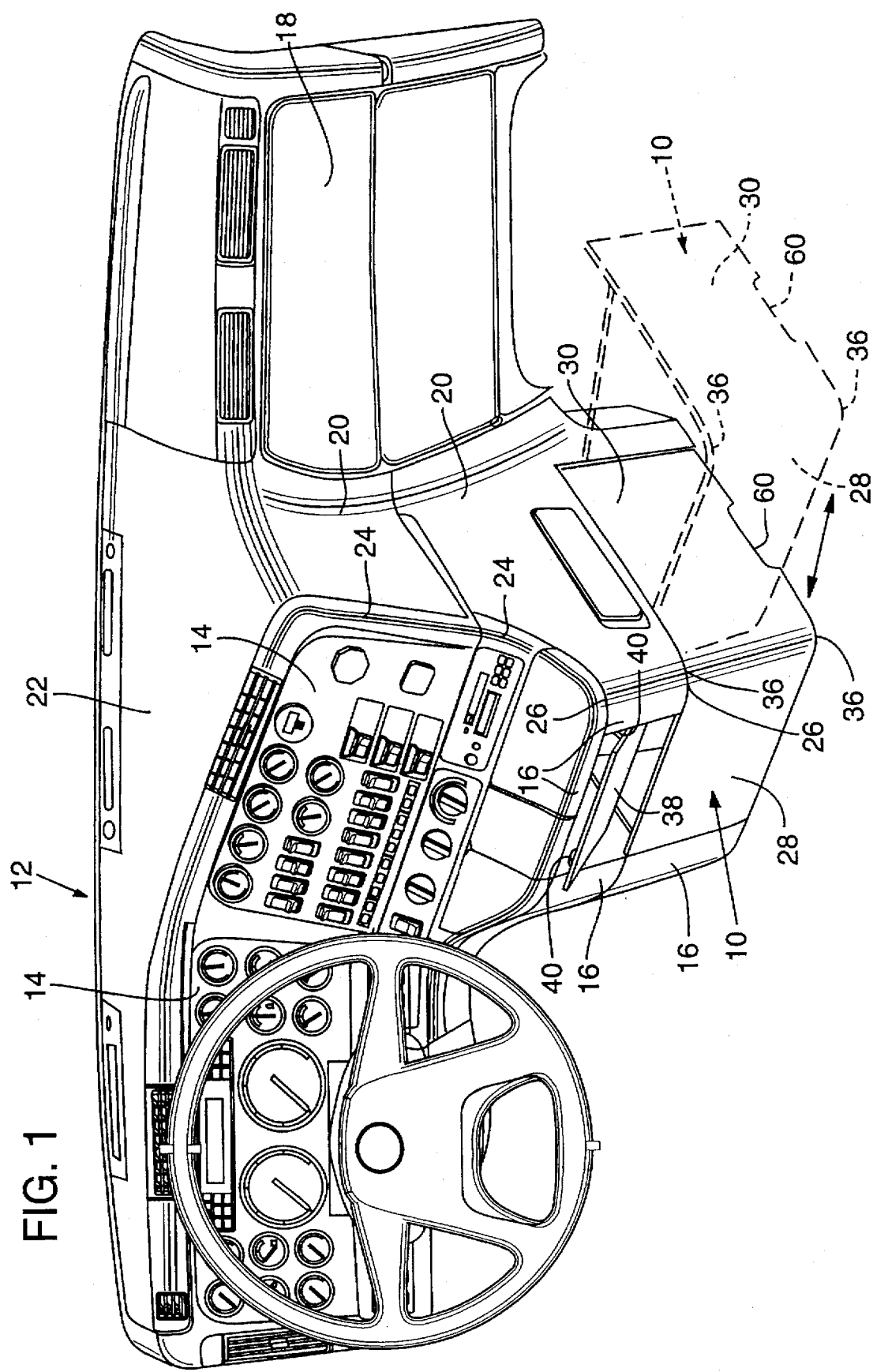
FIG. 1 is a front perspective view of the cab console of a truck showing a trash container of one form of the present invention in its closed and open positions.

With reference to FIG. 1, the retractable trash container 10 of the present invention is shown in conjunction with a truck cab console 12. The trash cab console 12 is located inside a truck cab and beneath the windshield of a truck having an engine and wheels (not shown).

For reference purposes and with respect to the illustrated embodiment, the driver side of the cab console surface is generally defined by an instrument panel 14 and a driver side wall panel 16. The passenger side of the cab console surface is generally defined by a glove compartment panel 18 and a passenger side wall panel 2C. The cab console 12 has a top panel 22 which generally extends from the driver side of the console to the passenger side of the console. The driver side wall panel 16 substantially faces towards the driver seat (not shown) and away from the passenger seat (not shown). The passenger side wall panel 20 substantially faces towards the passenger seat and away from the driver seat. The passenger side wall panel 20 generally intersects the instrument panel 16 along edge 24, and the driver side wall panel 16 along a corner 26.

The trash container 10 of the present invention is incorporated or integrated into the console 12 and in the illustrated form is located underneath a portion of the driver panel 16 and the passenger panel 20. As discussed herein, the trash container's surface preferably conforms to or is integral with the adjacent contour of the console's surface. In addition, the trash container most preferably has a base which is positioned at or adjacent the floor level of the cab, allowing for easier access to the trash container by the passenger and driver. Further, the configuration and location of the trash container in the console is unobtrusive to the driver and the passenger, and does not interfere with their operation or interaction with the instruments on the console. Also, in this regard, the trash container of the present invention provides an aesthetically pleasing appearance in conjunction with the overall look of the console, and hides unsightly trash from open view within the cab.

Figure 2:
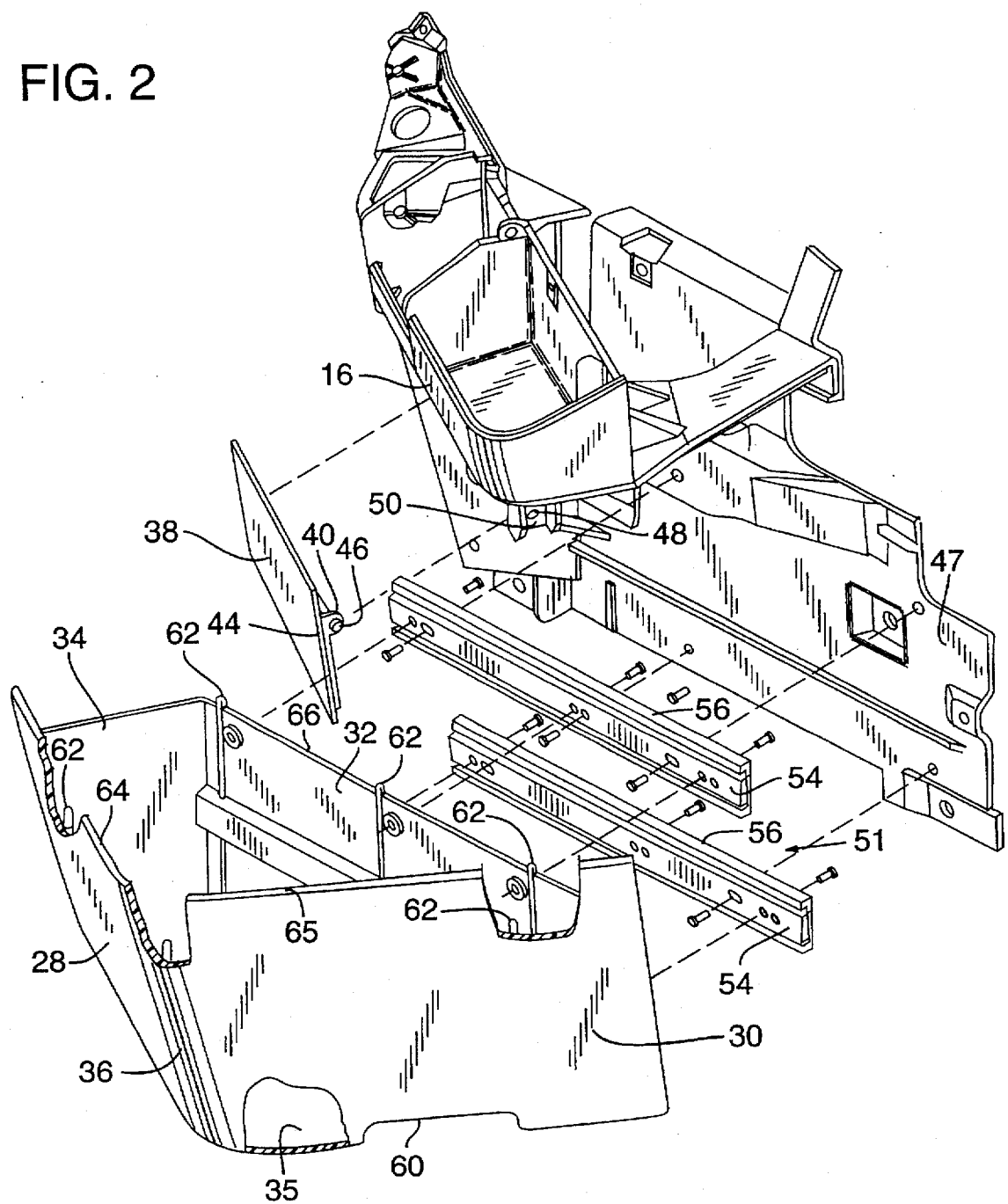
FIG. 2 is an exploded perspective view of the trash container of FIG. 1 and sliding mechanism therefore, and showing a break-away section of the trash container and a partial view of the cab console.

More specifically, and with reference to FIGS. 1 and 2, the trash container 10 of the present invention has four side walls and a bottom or base. The walls and base form a sealed trash receptacle which prevents the leakage of spilled materials into the cab from the trash box. The four side walls include two front side walls 28, 30, a back side wall 32, and rear side wall 34. A portion of the base is indicated at 35 in FIG. 2, and is positioned at or adjacent the floor level of the cab. Referring to the embodiment shown in FIG. 2, the four side walls of the trash container essentially form a trapezium, or a quadrilateral having no parallel sides. In addition, side walls 28, 30 in this embodiment are angled outwardly in a vertical direction relative to the base to conform to the contour of the front surface of the console. Although variable depending upon the console dimensions, in the FIGS. 1 and 2 embodiment, the front wall 28 is approximately twelve inches in length and nine and one-half inches in height. Front wall 30 is approximately thirteen and one-half inches in length and nine and one-half inches in height. The back wall 32 is approximately thirteen and one-half inches in length and eight inches in height, and the rear side wall 34 is approximately five inches in length at the top and three inches in length at the bottom and eight inches in height. Thus, a trash container 10 of a substantial volume is provided in the console 12. The trash container is of a durable material and may be molded of plastic, with ABS plastic being an exemplary material.

Side walls 28, 30 are considered "front" side walls since they are exposed, or visible from within the cab, when the trash container 10 is in its normally "closed" position, as shown in FIG. 1. Front side walls 28, 30 intersect to form a curved or rounded corner 36 on the container. As illustrated, front side wall 28 of the trash container is essentially flush or integral with the driver side wall panel 16 of the console 12. Likewise, front wall 30 of the trash container is essentially flush or integral with the passenger side wall panel 20 of the console, and thereby faces the passenger seat area. And further, the rounded corner 36 of the trash container is integral with or conforms with the curvature or contour of corner 26 on the console. In this regard, the corner 36 of the trash container is essentially flush or integral with the corner 26 of the console.

Thus, when the trash container 10 is in the "closed" position, the trash container appears integral with the cab console 12. In other words, the trash container surface conforms to the contour of the cab console surface to provide an aesthetically pleasing look in conjunction with the overall cab console. Further, by being integral with the cab console, the trash container is unobtrusive to the occupants of the truck cab and does not interfere with their operation or interaction with other console features or controls. In addition, in this configuration, the inside or interior of the trash container is shielded behind the front of the cab console. Thus, the trash in the container is not visible to the occupants of the cab.

In a further aspect of the invention, a trash-receiving opening or access is provided in the console through which trash may be deposited into the trash container. The opening may be located elsewhere, but is preferably defined in the console. A trash door 38 (FIG. 1) is preferably provided in a position overlying the opening to allow access to the trash container 10 when it is in the closed position. In the illustrated embodiment, the trash door 38 is provided in the driver side wall 16 of the cab console 12 and above the front wall 28 of the trash container. Other access openings or doors may also be provided if desired, for example on the passenger side of the console. In this respect, the trash door 38 essentially forms a part of the driver side wall 16 and is integral therewith.

The trash door 38 is connected to the driver side wall 16 such as by a hinge mechanism. For example, the trash door 38 pivots inwardly (as shown in FIG. 1) about a horizontal pivot axis to an open position upon application of a slight force to the trash door by an occupant of the cab. By opening the trash door 38, access is provided to the inside of the trash container to dispose of trash. Once the trash is disposed inside the container, it is no longer visible to the cab's occupants until the trash container 10 is moved to the open position for cleaning.

Figure 3:
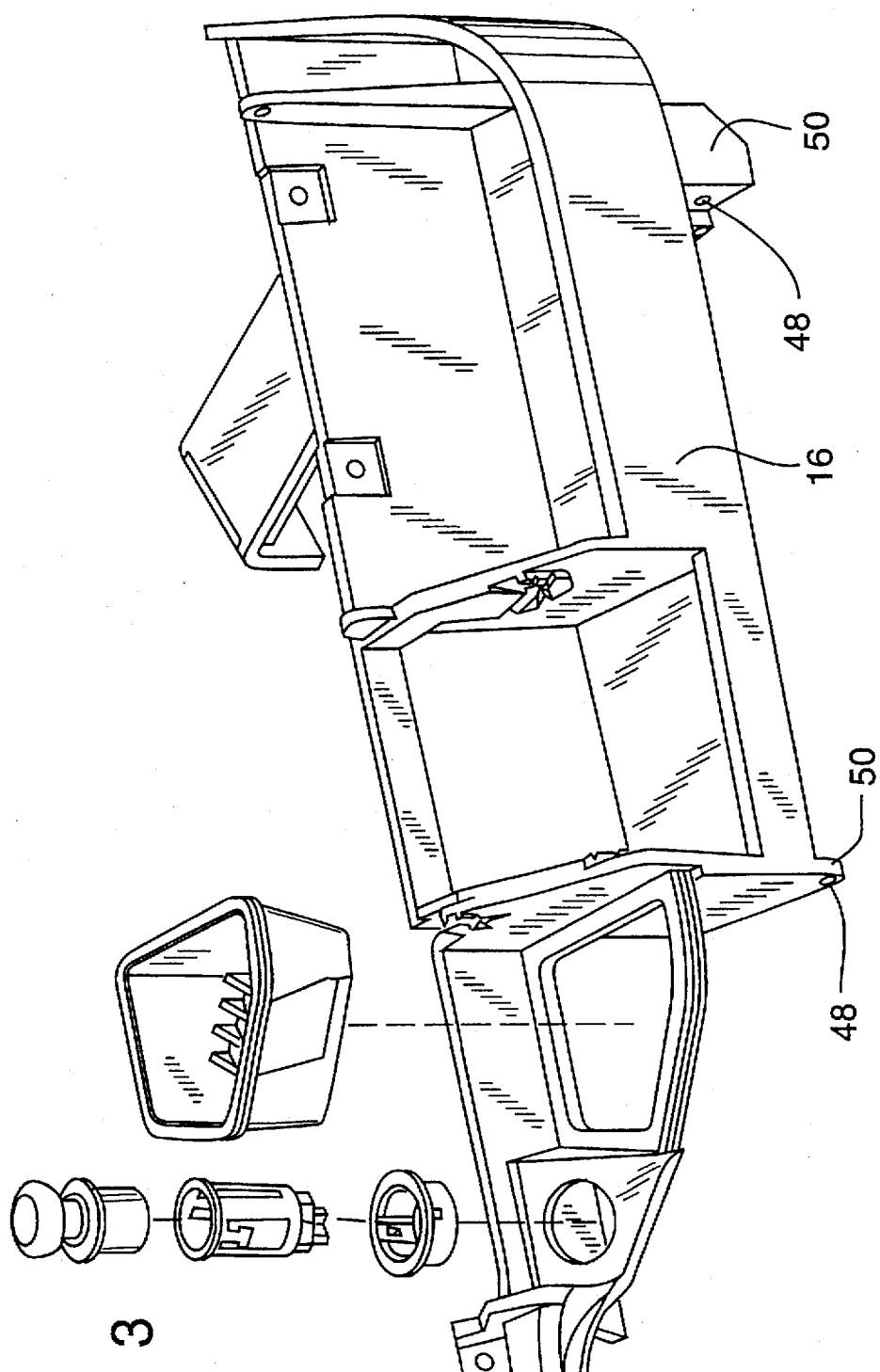
FIG. 3 illustrates a portion of the cab console having protrusions with holes for pivotally hanging a trash door thereto.

The back side of the trash door 38 has two protrusions 40, each having a hole therethrough (only one such protrusion is shown in FIG. 2). The protrusions project rearwardly from the opposed side edges 44 of the trash door 38. A pin 46 (FIG. 2) is inserted through the respective holes in the protrusions and through corresponding holes 48 located in protrusions 50 on the console (see FIGS. 2 and 3). The protrusions 40 on the door are located above the midpoint of the width of the trash door and thus above its center of gravity. As a result, the trash door 38 is biased, in this case by gravity, to pivot back to the closed position upon release of pressure or force to the bottom of the door. The hinge may be spring-loaded to further bias the trash door to close automatically when the user releases the force of his or her hand against the door once the trash is disposed of in the container.

The trash container 10 of the illustrated embodiment also is easily and conveniently shifted from its "closed" position to an "open" position in order to remove any accumulated trash. In one preferred approach, the trash container is suspended from an upright wall portion 47 of the cab or rear wall of the console in a manner that permits the container to shift to a position in which a trash bag is exposed for removal from the container. In the illustrated embodiment of FIG. 2, a sliding mechanism 51 is provided to accomplish this result. More particularly, the back wall 32 of the trash container is provided with at least one slide rail 54 and most preferably at least two parallel spaced-apart elongated slide rails which are mounted to the back wall of the trash container (by fasteners or the like). As shown in FIG. 2, each slide rail 54 matingly engages a corresponding elongated guide track 56 attached to the wall portion 47 of the cab console 12. When the trash container is in the closed or trash-receiving position, the slide rails 54 engage substantially the entire length of the corresponding guide tracks 56. In this manner, the trash container is firmly and slidably retained to the cab console and can be selectively moved. Conveniently, each slide rail 54 and guide track 56 combination are components of a commercially available drawer slide with a release which permits removal of the slide rail 54 from the guide track 56. Therefore, the trash container may be totally removed from the console if desired, for example, for more extensive cleaning. Suitable drawer slides for use in accordance with the present invention are available from Accuride International Incorporated of Sante Fe Springs, Calif.

In another aspect of the present invention, the front wall 30 of the trash container (which faces the passenger seat) is provided with a handle 60 or hand groove. The hand groove 60 may be made by forming or molding an indentation along the lower edge of the front wall and the bottom of the trash container, as illustrated in FIGS. 1 and 2. The handle or hand groove 60 should be wide enough to accommodate the hand of an average person. To move the trash container to the open position, the occupant of the cab simply places his or her hand in the hand groove and pulls on the trash container. In doing so, the slide rails 54 of the trash container slide along the guide tracks 56. The slide rails 54 and guide tracks 56 in this case essentially have longitudinal axes which lie along parallel lines which extend into the direction of the container's movement to the area in front of the passenger seat. Consequently, ample unobstructed room is provided in front of the passenger seat to accommodate movement of the trash container to an open position (as shown in dashed lines in FIG. 1).

In a further aspect of the invention, the trash container 10 may be provided with a trash bag retainer to retain a trash bag (not shown) in place inside the container. Referring to FIG. 2, a plurality of protrusions 62 or hooks are formed along the upper edges 66 of back wall 32 of the trash container and below but near the top edges 64, 65 of the front walls 28, 30, respectively. As shown in FIG. 2, three bag-retaining protrusions 62 are arranged along the front walls 28, 30, and three are arranged along the back wall 32. Thus, portions of the top edge or perimeter of a flexible trash bag can be received or hooked over the protrusions to retain the trash bag in place. In this way, the top edge of the trash bag will substantially extend along the inside perimeter of the trash container so that the bag will line the trash container for receiving trash disposed therein. Garbage or trash which is inserted into the container via the trash door will fall into the trash bag. When the container needs to be emptied, it is moved to the open or trash-removing position, as discussed above, and the perimeter of the trash bag is unhooked from the protrusions. The trash bag can then be removed from the container and replaced with a new bag. Alternatively, the trash in the bag can be emptied into another container and the bag replaced in the container in the above-described manner.

Having described and illustrated the principles of the invention with reference to a preferred embodiment and several variations thereon, it should be apparent that the invention can be modified in arrangement and detail without departing from its principles. Accordingly, we claim all modifications as may come within the scope and spirit of the following claims.

We claim:

1. A trash container apparatus for a truck cab comprising:
   a console having a front surface;
   a trash container having an inside for receiving trash therein, and at least one front side, said at least one front side being of a contour which integrates with the front surface of the cab console and the cab console shielding the inside of the container from view by the occupants of the cab when said trash container is in a closed position;
   the console defining a trash container access opening through which trash is deposited into the trash container when the trash container is in a closed position;
   said trash container being selectively movable from a closed position to an open position, when in the open position the trash container a positioned away from the front surface of the cab console to allow access to the inside of the container to remove any accumulated trash;
   upright trash door positioned to allow access through a trash-receiving opening covered by the door to the inside of the trash container for disposing trash therein when the trash container is in the closed positioned; and
   the trash container has two front sides, a first of said front sides substantially facing a driver's seat in the cab and a second front side substantially facing a passenger seat in the truck cab, wherein the trash door is positioned on the cab console substantially above the trash container and above the first of said front sides and is pivotable about a hinge to move it from a closed position to an open position to allow access through the trash-receiving opening to the inside of the trash container for disposing trash therein, and wherein the two front sides are visible to an occupant in the cab when the trash container is in the closed position.

2. The trash container apparatus of claim 1, further comprising:
   a handle at the second of said front sides of the trash container to allow an occupant of the cab to move the trash container from the closed position to the open position.

3. A trash container apparatus for a truck cab comprising:
   a trash container having two front sides, one of said front sides substantially facing the driver seat in the cab, and the other front side substantially facing the passenger seat in the cab, and said front sides conforming to the walls of the cab console when the trash container is in the closed position;
   said front sides and the cab console shielding the inside of the container from view by an occupant of the cab when said trash container is in a closed position;
   the console defining a trash container access opening through which trash is deposited into the trash container; and
   said trash container being selectively movable from a closed position to an open position, when in the open position the trash container is in an area substantially in front of the passenger seat to allow access to the inside of the container to remove any accumulated trash.

4. The trash container apparatus of claim 3, further comprising:
   a trash door positioned on the cab console substantially above the front side of the trash container facing the driver seat.

5. A trash container apparatus for a truck cab console, comprising:
   a trash container integrated into the console and having an inside for receiving trash therein through a trash-receiving opening, the trash container having two front sides, one of said front sides substantially facing a driver seat in the cab, and the other front side substantially facing a passenger seat in the cab; and said trash container being movable in a direction along a line which extends into an area substantially in front of the passenger seat such that said trash container can be moved from a closed trash-receiving position to an open position in which the trash container is positioned to the area substantially in front of the passenger seat to allow access to the inside of the container to remove any accumulated trash;

and wherein the two front sides are visible to an occupant in the truck cab when the trash container is in the closed position.

6. The trash container apparatus of claim 5, further comprising:

a guide track attached to an interior wall of the cab, the guide track having a longitudinal axis extending parallel to said line along which the trash container is movable and toward the area in front of the passenger seat;

a slide rail attached to one side of the trash container, said slide rail slidably engaging said guide track, and said slide rail being operable to slide along said guide track to move the trash container from its closed position and away from an area in front of a driver's seat in the cab to the open position.

7. The trash container apparatus of claim 5, further comprising:

an upright trash door overlying the trash-receiving opening to allow access to the inside of the trash container for disposing trash therein when the trash container is in the closed positioned.

8. The trash container apparatus of claim 7, wherein the trash door is positioned on the cab console substantially above the trash container and above the said one of said front sides substantially facing the driver's seat and is pivotable about a hinge to move it from a closed position to an open position to allow access to the inside of the trash container for disposing trash therein.

9. The trash container apparatus of claim 5 adapted to receive trash bag having a top edge bounding an opening leading to the interior of the trash bag, the trash container having a perimeter bounding an opening leading to the interior of the trash container and the trash container apparatus further comprising:

a plurality of upwardly projecting protrusions located on the inner sides of the trash container, whereby said protrusions are capable of retaining the top edge of a trash bag along a substantial portion of the perimeter of the trash container so that the trash bag lines the trash container and receives trash deposited therein.

10. The trash container of claim 5, further comprising:

a handle on the front side of the trash container facing the passenger seat to allow an occupant of the cab to move the trash container from the closed position to the open position.

11. A trash container apparatus for a truck cab having a floor, the trash container apparatus comprising a truck console, the trash console having an upright wall;

a trash container mounted to the upright wall, the trash container having a base adjacent to the floor of the cab;

the trash container apparatus including a trash-receiving opening through which trash may be deposited into the trash container when the trash container is in a closed position; and the trash container and console each have at least two front walls which are configured such that the front walls of the trash container have the contour of the front walls of the console.

12. A trash container apparatus according to claim 11 in which the trash container has a back wall and includes at least one slide suspending the trash container back wall to the upright wall so as to permit the trash container to slide from a closed to an open position away from the console for removal of trash deposited in the container; and wherein the upright wall comprises a rear wall of the console.

13. A trash container apparatus for a truck cab having a floor, the trash container apparatus comprising;

a truck console, the truck console having an upright wall;

a trash container mounted to the upright wall, the trash container having a base adjacent to the floor of the cab;

the trash container apparatus including a trash-receiving opening through which trash may be deposited into the trash container when the trash container is in a closed position; and the trash container has a back wall and includes at least one slide suspending the trash container back wall the upright wall so as to permit the trash container to slide from a closed to an open position away from the console for removal of trash deposited in the container; and wherein the upright wall comprises a rear wall of the console; and the console and the trash container each have two front wall sections which come together at a corner, the two trash container wall sections being exposed at the interior of the truck cab so as to be visible to an occupant of the cab when the trash container is in the closed position and with the corner of the trash container being flush with the corner of the console when in the closed position.

14. A trash container according to claim 13 in which the trash container includes a trash bag retainer.

15. A trash container according to claim 13 including a door pivoted to the console and overlying the opening when in a closed position, the door being pivoted to an open position to expose the trash-receiving opening for the deposit of trash therethrough.

16. A trash container apparatus for a truck cab console, comprising:

a trash container supported by the console and having an inside for receiving trash therein through a trash-receiving opening, the trash container having two front sides, one of said front sides substantially facing a driver seat in the cab, and the other front side substantially facing a passenger seat in the cab;

said trash container being movable from a closed trash-receiving position in which trash may be deposited through the trash receiving opening and into the trash container to an open position in which the trash container is positioned away from the console to allow access to the inside of the container to remove any accumulated trash; and said two front sides being exposed to an occupant in the cab when the trash container is in the closed position, and the console concealing the trash container from view when the trash container is in the closed position.

17. A trash container apparatus according to claim 16 in which:

the trash container has four side walls and a base, the four side walls forming a trapezium.

18. A trash container apparatus according to claim 17 in which the side walls are angled outwardly relative to the base.

19. A trash container according to claim 17 in which the two front sides intersect at a corner.

* * * * *